W. B. MURTHA.
COMBINED COAT AND HAT HANGER.
APPLICATION FILED OCT. 8, 1919.
1,342,346. Patented June 1, 1920.
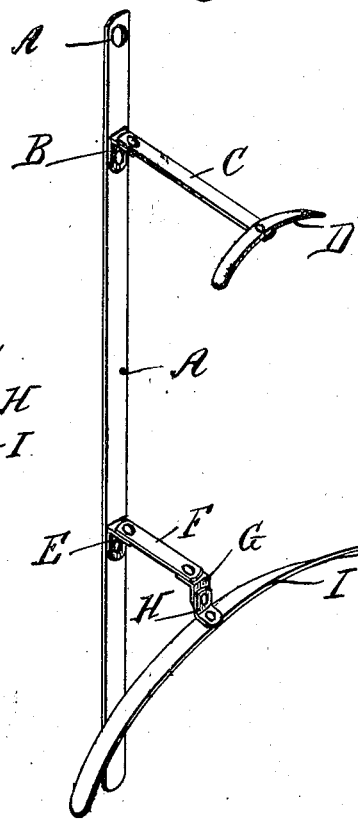
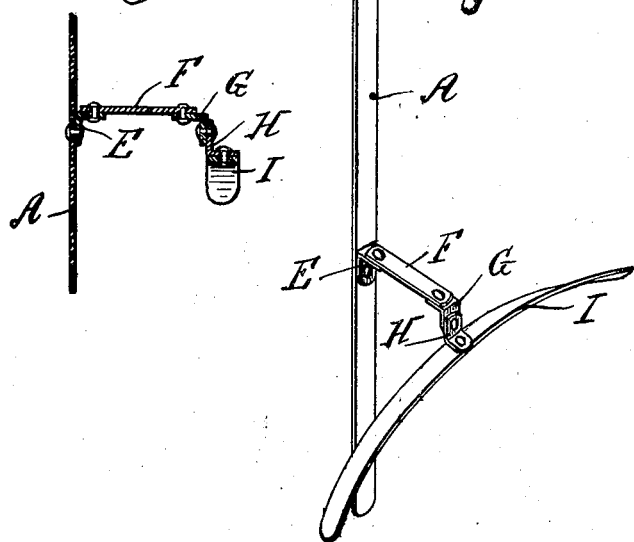
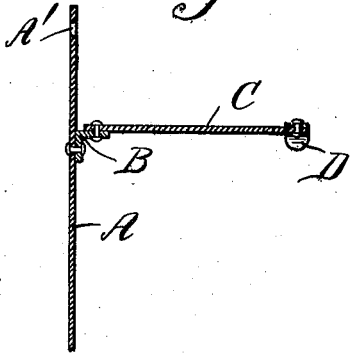
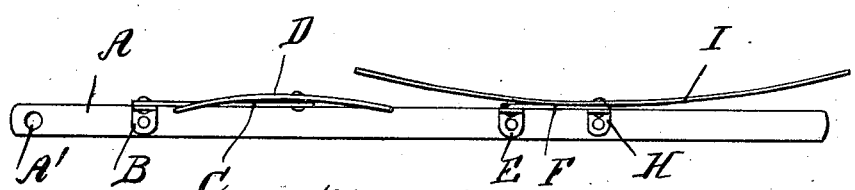
Inventor
Walter B. Murtha,
By his Attorney
Geo. A. Hoffman

UNITED STATES PATENT OFFICE.

WALTER B. MURTHA, OF NEW YORK, N. Y.

COMBINED COAT AND HAT HANGER.

1,342,346.   Specification of Letters Patent.   Patented June 1, 1920.

Application filed October 8, 1919. Serial No. 329,234.

*To all whom it may concern:*

Be it known that I, WALTER B. MURTHA, a citizen of the United States, residing at New York, in the county of New York and State of New York, have invented certain new and useful Improvements in Combined Coat and Hat Hangers, of which the following is a full, clear, and exact specification.

This invention relates to a combined coat and hat hanger, and has for its object to provide a device of this kind which can be manufactured at low cost, which can readily be folded away when not in use, so as to take up but little room, and which can easily be unfolded for use at any convenient place.

An example of my invention has been shown in the accompanying drawings, in which Figure 1 is a perspective view of my improved hanger in its unfolded position or position of use. Fig. 2 is a vertical section through the upper or hat holding portion of the device; Fig. 3 is a corresponding section through the lower or coat-holding portion of the device; and Fig. 4 shows the hanger in its folded position.

The hanger is preferably made of sheet metal or other suitable material and comprises a main supporting member or bar A, provided at its upper end with an opening A' for supporting the hanger on a hook, nail or the like when it is desired to use it. Near this upper end the member A, has secured to it, as for instance by riveting, a bracket or angle B, which carries a lateral member or bar C which, in the position of use, extends preferably transversely of the bar A. To the end of this bar C is secured the hat-supporting member D, which may be slightly curved and extends, in the position of use, transversely of the bar C, to both sides thereof.

At a point intermediate the bracket B and the end of the bar A opposite to that having the opening A', the bar A carries another angle or bracket, E, to which is secured a transverse member F extending parallel to the bar C, but preferably shorter than said bar C. At its free end the bar C carries a bracket G which in turn is connected with another bracket or angle H. To the free portion of this angle H is secured the coat-supporting member I which, like the hat-supporting member D, may be slightly curved and extends in a direction corresponding to that of the member D, that is to say, laterally to both sides of the bar or transverse member F.

In the position of use shown in Figs. 1, 2 and 3, the curved bar D will serve as a support for a hat and the bar I as a support for a coat. Owing to the fact that the transverse bar C is longer than the corresponding bar F on the coat hanger, the hat will be held at a slightly greater distance from the main supporting member A than the coat, and the hat and coat will thus not interfere with each other.

It is to be understood that the connections between the various parts are pivotal connections formed by riveting the parts together loosely, yet tightly enough to prevent them from moving relatively to each other while the hanger is in use. The construction and connection of the parts is such that the weight of the hat and coat will not tend to fold the hanger. When, however, it is desired to fold the device, the various parts may be swung on their pivots, and the hanger may be folded as shown in Fig. 4, with the main member, the transverse members and the coat and hat supporting members extending substantially parallel to each other. In this condition it will be very compact and take up very little space, and it may thus conveniently be put away in a trunk or suitcase, and if made small enough, even in a coat pocket.

If desired, the main supporting member may be formed or provided with a hook at its upper end, so that the device may be used on a clothes stand or the like.

Various modifications may be made without departing from the nature of my invention as set forth in the appended claims.

I claim as my invention:

1. In a device of the character described, a main supporting member, an angle bracket pivotally secured thereto, a bar normally extending transversely to said main member and pivotally secured to said bracket at one end, and a garment supporting member pivotally supported on the other end of said transverse bar.

2. In a device of the character described, a main supporting member, angle brackets pivotally secured thereto at different distances from its ends, a bar pivotally secured to each of said brackets and normally extending transversely to said main member, said transverse bars being of different lengths, and a garment supporting member secured to each transverse bar.

3. In a device of the character described, a main supporting member, transverse bars secured thereto at different distances from its ends, said bars being of different lengths, and garment supporting members connected with said transverse members, the connections between said garment supporting members and said transverse bars, and between the latter and the main supporting member being such that all the members may be folded substantially parallel to each other.

In testimony whereof I affix my signature in the presence of two witnesses.

WALTER B. MURTHA.

Witnesses:
ELSIE FISCHER,
MINNIE ENDSOR.